(12) United States Patent
Demirkan

(10) Patent No.: US 10,392,810 B1
(45) Date of Patent: Aug. 27, 2019

(54) UNIVERSAL LIGHTWEIGHT AND PORTABLE DEICING MAT

(71) Applicant: James Demirkan, Seattle, WA (US)

(72) Inventor: James Demirkan, Seattle, WA (US)

( * ) Notice: Subject to any disclaimer, the term of this patent is extended or adjusted under 35 U.S.C. 154(b) by 297 days.

(21) Appl. No.: 15/629,730

(22) Filed: Jun. 21, 2017

Related U.S. Application Data

(60) Provisional application No. 62/493,086, filed on Jun. 22, 2016.

(51) Int. Cl.
| | | |
|---|---|---|
| *E04D 13/10* | (2006.01) | |
| *B60S 1/66* | (2006.01) | |
| *H05B 1/02* | (2006.01) | |
| *H05B 3/36* | (2006.01) | |

(52) U.S. Cl.
CPC .............. *E04D 13/103* (2013.01); *B60S 1/66* (2013.01); *H05B 1/0236* (2013.01); *H05B 3/36* (2013.01)

(58) Field of Classification Search
CPC ...... E04D 13/103; H05B 1/0236; H05B 3/36; B60S 1/66
See application file for complete search history.

(56) References Cited

U.S. PATENT DOCUMENTS

| | | | | | |
|---|---|---|---|---|---|
| 3,691,343 | A | * | 9/1972 | Norman ................ | E04D 13/103 165/47 |
| 3,721,800 | A | * | 3/1973 | Eisler ..................... | F24D 13/02 219/213 |
| 3,792,232 | A | * | 2/1974 | Zarenko ............ | B32B 17/10036 219/522 |
| 4,025,893 | A | * | 5/1977 | Bergersen ................ | H01C 3/06 219/528 |
| 4,092,626 | A | * | 5/1978 | Bergersen ................ | H01C 3/06 219/528 |
| 4,582,763 | A | * | 4/1986 | Wakabayashi ........... | C08J 7/047 428/474.4 |
| 5,643,480 | A | * | 7/1997 | Gustavsson ........ | A41D 13/0051 219/211 |
| 6,164,564 | A | * | 12/2000 | Franco .................... | B60S 1/245 239/139 |
| 6,180,929 | B1 | * | 1/2001 | Pearce .................. | E01C 11/265 219/213 |
| 6,184,496 | B1 | * | 2/2001 | Pearce .................. | E01C 11/265 219/202 |
| 6,483,086 | B1 | * | 11/2002 | Wolff ....................... | H05B 3/36 219/213 |
| 6,958,116 | B1 | * | 10/2005 | Bennett ................... | C23F 13/16 204/196.18 |
| 9,321,364 | B1 | * | 4/2016 | Ashworth ................. | B60L 5/02 |

(Continued)

*Primary Examiner* — Kevin R Kruer

(57) ABSTRACT

The Universal Lightweight and Portable Deicing Mat Mat is made of standard top of the line electrically operated and self-regulating standard commercial grade heating cables, which are enclosed between two thin, lightweight, yet strong and protective Neoprene Rubber like sheeting materials, allowing them to endure harshest of winter seasons. These mats can be placed either externally on top of tractor trailers, or they can be placed internally, inside of the tractor trailer, above the ceiling. Both ways can then be secured with custom designed mounting kits, (discussed in further detail). These Deicing Mats can also be used on roofs of residential homes as well as other types of commercial buildings and automobiles.

11 Claims, 14 Drawing Sheets

(56) References Cited

U.S. PATENT DOCUMENTS

| | | | |
|---|---|---|---|
| 2002/0117495 A1* | 8/2002 | Kochman | H05B 3/34 |
| | | | 219/549 |
| 2004/0035853 A1* | 2/2004 | Pais | E01C 11/265 |
| | | | 219/548 |
| 2007/0210073 A1* | 9/2007 | Hubert | B64D 15/12 |
| | | | 219/535 |
| 2008/0230530 A1* | 9/2008 | Augustine | H05B 3/342 |
| | | | 219/212 |
| 2010/0038356 A1* | 2/2010 | Fukuda | H01C 7/021 |
| | | | 219/549 |
| 2010/0159251 A1* | 6/2010 | Brandt | B23K 26/38 |
| | | | 428/426 |
| 2010/0288752 A1* | 11/2010 | Lee | H05B 3/24 |
| | | | 219/544 |
| 2011/0297662 A1* | 12/2011 | Clark | E04D 13/103 |
| | | | 219/213 |
| 2012/0043310 A1* | 2/2012 | Wuchert | H05B 3/34 |
| | | | 219/507 |
| 2012/0045954 A1* | 2/2012 | Bleecher | C09K 3/18 |
| | | | 442/80 |
| 2012/0298804 A1* | 11/2012 | Lewis | B64D 15/12 |
| | | | 244/134 D |
| 2013/0056246 A1* | 3/2013 | Laurencot | H05B 3/84 |
| | | | 174/251 |
| 2014/0097178 A1* | 4/2014 | Whitcraft | H05B 3/34 |
| | | | 219/528 |
| 2015/0189699 A1* | 7/2015 | Ploshikhin | H05B 3/34 |
| | | | 219/541 |
| 2015/0229030 A1* | 8/2015 | Dai | H01Q 15/0013 |
| | | | 219/203 |
| 2016/0060871 A1* | 3/2016 | Kulkarni | E04D 13/103 |
| | | | 219/213 |
| 2016/0286608 A1* | 9/2016 | Maughan | H05B 1/0236 |
| 2016/0369466 A1* | 12/2016 | Chi-Hsueh | E01H 5/10 |
| 2017/0067653 A1* | 3/2017 | Forsbom | F24D 13/02 |
| 2017/0111960 A1* | 4/2017 | Arafa | H05B 3/36 |
| 2017/0211241 A1* | 7/2017 | Calinescu | E01C 5/005 |
| 2018/0037102 A1* | 2/2018 | Wade | B60J 11/06 |
| 2018/0187380 A1* | 7/2018 | Naylor | E01C 11/265 |
| 2018/0193185 A1* | 7/2018 | Thomas | A61F 7/007 |
| 2019/0024325 A1* | 1/2019 | Dong | E01C 9/083 |
| 2019/0031116 A1* | 1/2019 | Bulgajewski | B60R 11/04 |

* cited by examiner

UNIVERSAL LIGHTWEIGHT AND PORTABLE DEICING MAT

CROSS-REFERENCE TO RELATED APPLICATIONS

The present application claims priority under U.S. Provisional patent application No. 62/493,086 entitled "Universal Lightweight and Portable Deicing Mat" filed on Jun. 22, 2016, which is incorporated by reference in its entirety.

FIELD OF THE INVENTION

The present invention relates to the field of an apparatus and the method of eliminating ice buildup on roofs of structures and vehicles.

BACKGROUND OF THE INVENTION

During winter months, in the trucking industry, there are numerous accidents caused from fallen snow and ice off roofs of various types of large freight haulers, causing the large blocks of ice and snow to collapse and fall onto smaller cars in the rear or along the sides of these freight haulers, while in transit. Usually these accumulations of snow and ice form on top of freight haulers while waiting to load or unload shipping materials at customers' facilities prior to transit. Because of these issues, many truckers are forced to deal with very serious implications such as fines, demerit points, and possible liability claims that can easily result from these accidents caused by windborne pieces of ice and snow from trailer roofs. Though many fleet managers believe that the accumulation of snow and ice do cause extreme safety hazards, they also believe as well as many others, that there are only very few accessible and/or expensive, industry-standard solutions.

For homeowners, in certain parts of the country with colder climates, snow and ice can build up on roofs in the winter, causing ice dams or adding a tremendous amount of extra weight to the structure causing your roof collapse? You need to consider removing the snow and ice immediately too avoid and prevent these ice dams and roof collapses. But human nature dictates sometimes that it just takes too long to take the necessary steps to go out to shovel snow off these roofs. Or sometimes it takes a considerable amount of time to string-up deicing cables, making sure they're measured correctly apart and trying to determine the cable pattern to layout on these roofs.

SUMMARY OF THE INVENTION

This section is for the purpose of summarizing some aspects of the present invention and to briefly introduce some preferred embodiments.

My present invention eliminates these issues by inexpensively incorporating an already obtainable top of the line electrically operated and self-regulating, standard commercial grade Deicing Cables into a Lightweight Matting Material. These can be installed in Standard Sizes as well as Cut to Shape into Different Angles. My Invention can also be Custom Manufactured for customers' specs as well as comprising of different colors to match any color of roofing material.

As seen in the prior art, even though there have been various configurations of Snow Removal Systems/Deicers, my invention is specifically designed to remove or prevent heavy accumulations of snow and ice of Logistical Container Truck s that is as portable, inexpensive, and as simple to install as this particular invention that I've created, the Universal Lightweight and Portable Deicing Mat. Among the past known patents for Snow Removal Systems/Deicer systems for roofing surfaces of Logistical Container Truck s are Valverde (U.S. Pat. No. 7,921,502), Cendeletti (U.S. Pat. No. 5,989,356), Schmitt (U.S. Pat. No. 6,453,500), Couture (U.S. Pat. No. 7,617,561), Duncan (U.S. Pat. No. 7,650,660), Barnes (U.S. Pat. No. 5,550,350), Yeaglin (U.S. Pat. No. 5,802,654), Bouchard (U.S. Pat. No. 6,654,978), Quinn (U.S. Pat. No. 9,126,238), Burns (U.S. Pat. No. 9,352,726), Alammari (U.S. Pat. No. 9,228,353), Morse (U.S. Pat. No. 6,442,876), Supplee (U.S. Pat. No. 6,202,329), Edwards (U.S. Pat. No. 9,009,904), Clifford (U.S. Pat. No. 8,689,500), Tenute (U.S. Pat. No. 6,759,630), Swanfeld (U.S. Pat. No. 5,878,533), Tourangeau (U.S. Pat. No. 5,391,858), Winters (U.S. Pat. No. 6,348,673), Miller (U.S. Pat. No. 6,087,630), Tiburzi (U.S. Pat. No. 5,786,563), Taouil (U.S. Pat. No. 4,769,526), Evans (U.S. Pat. No. 6,727,471), Edwards (U.S. Pat. No. 8,578,542), Rigo (U.S. Pat. No. 7,296,368) Wuchert (U.S. Pat. No. 8,598,499), Durham (U.S. Pat. No. 7,139,471).

In one aspect the invention is an apparatus comprising one or more deicing cables prefabricated in a geometric pattern, using either a Zig Zag Pattern or a Serpentine Pattern of said cables being positioned permanently within two layers of matting material to create a mat, providing series of openings along the edge of said mat; and a thicker edge along both sides of one face of said mat. In another aspect, it further comprises one or more mounting of Custom ZL Mounting Brackets, designed to secure the thicker edge, and one or more fasteners or other types of anchoring materials, designed to secure said Custom ZL Mounting Brackets, to a truck rooftop structure with one or more fasteners or other types of anchoring materials, designed to safely attach said mat. In yet another aspect, said thicker edge of the said mat is a convex shaped, to be held firmly in place by anchoring material.

Other features and advantages of the present invention will become apparent upon examining the following detailed description of an embodiment thereof, taken in conjunction with the attached drawings.

BRIEF DESCRIPTION OF THE DRAWINGS

A fuller understanding of the nature and the objects of the present invention will be more apparent upon consideration of the following detailed description taken in connection with the accompanying drawings. It should be understood that any electrical plugs and/or extension cables supplied with this invention can be incorporated within existing power source of freight haulers, various vehicles, and roofing shingles with optional Ground fault circuit interrupter (GFCI) built into the unit.

DETAILED DESCRIPTION OF THE PREFERRED EMBODIMENT

Figure 1A:
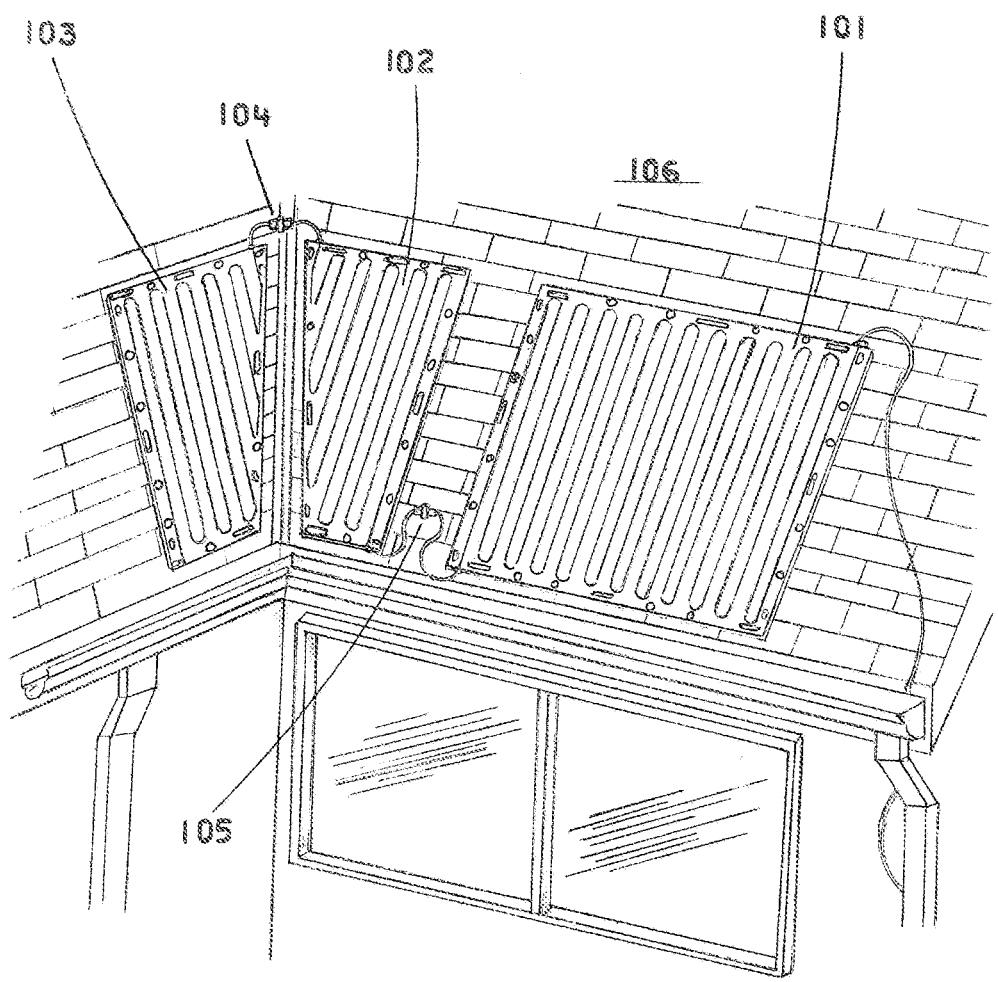
FIG. 1A depicts multiple Universal Lightweight and Portable Deicing Mats with different dimensions and shapes that are attached to shingle roofing.

To provide an overall understanding of the invention, certain illustrative embodiments and examples will now be described. However, it will be understood by one of ordinary skill in the art that the same or equivalent functions and sequences may be accomplished by different embodiments that are also intended to be encompassed within the spirit and scope of the disclosure. The compositions, apparatuses, systems and/or methods described herein may be adapted and modified as is appropriate for the application being addressed and that those described herein may be employed in other suitable applications, and that such other additions and modifications will not depart from the scope hereof.

The present invention is made of top of the line electrically operated and self-regulating, standard commercial grade heating cables, which are enclosed and sealed between two thin, lightweight, yet strong and protective Synthetic Elastomer Rubber like sheeting materials, such as energy efficient, Ethylene Propylene Diene Monomer (EPDM) like materials or Thermoplastic polyolefin (TPO) or more expensive materials like polytetrafluoroethylene (PTFE), allowing them to endure harshest of winter seasons. The means by which these Synthetic Elastomer Rubber like sheeting materials are sealed together will be by heat, by mechanical means or by chemical means.

These mats can be placed either externally on top of Logistical Containers, or they can be placed internally, inside of the Logistical Container, above the ceiling. Both ways can then be secured with custom designed mounting kits, (discussed in further detail). These Deicing Mats can also be used on roofs of residential homes as well as other types of commercial building and various sizes of vehicles.

For aesthetic purposes, these Universal Lightweight and Portable Deicing Mat will also comprise of different colors to match any color of roofing material. Can also be custom prefabricated to customer specs.

During the manufacturing process, these commercial grade self-regulating de-icing cables mat will be strategically laid out in a prearranged pattern that are bonded between the two thin layered, yet flexible, strong, and protective Synthetic Elastomer Rubber like sheeting materials. Because the entire unit is lightweight, my invention is easy to rollup and carry, and should only take minutes to install per panel on residential roofing (May take longer for custom roofing and Logistical Containers). After use or during the off-season, the Roof Deicing Mats can be rolled up and stored away just as quickly or can be left on unaffected by natural environments. My invention can be retrofitted to plug into existing powers sources of freight haulers, with optional Ground fault circuit interrupter (GFCI) built into the unit. They can also be draped flat on top of vehicles, secured by plurality of internal magnets and powered by Dual Power Source with choice of either AC or DC power.

Because these Deicing Mats are so lightweight, they are not meant to be placed on walkways or be put anyplace where any object can be rested upon. They are specifically tailored to be lightweight enough to carry and strategically be positioned on roofs of logistical containers, that comes with it's own Securing Hardware or roofs of residential homes and commercial buildings. These very same Deicing Mats can even be placed on various sized vehicles, using Standard Household Electrical Plug or a Vehicle's own Car Charger/Cigarette Lighter Outlet. A fuller understanding of the nature and the objects of the present invention will be more apparent upon consideration of the following detailed description taken in connection with the accompanying drawings.

FIG. 1A illustrates roof of building structure with shingle roofing surface, 106, protected with multiple Universal Lightweight and Portable Deicing Mats, 101, 102, and 103 that are interconnected, which come in different dimensions and shapes dictated by the angled of surface areas of that structure, as shown in 102 and 103. Also in this example, as you can see, these Universal Lightweight and Portable Deicing Mat are designed to link to each other by Electrical Connectors, 104 and 105.

Figure 1B:
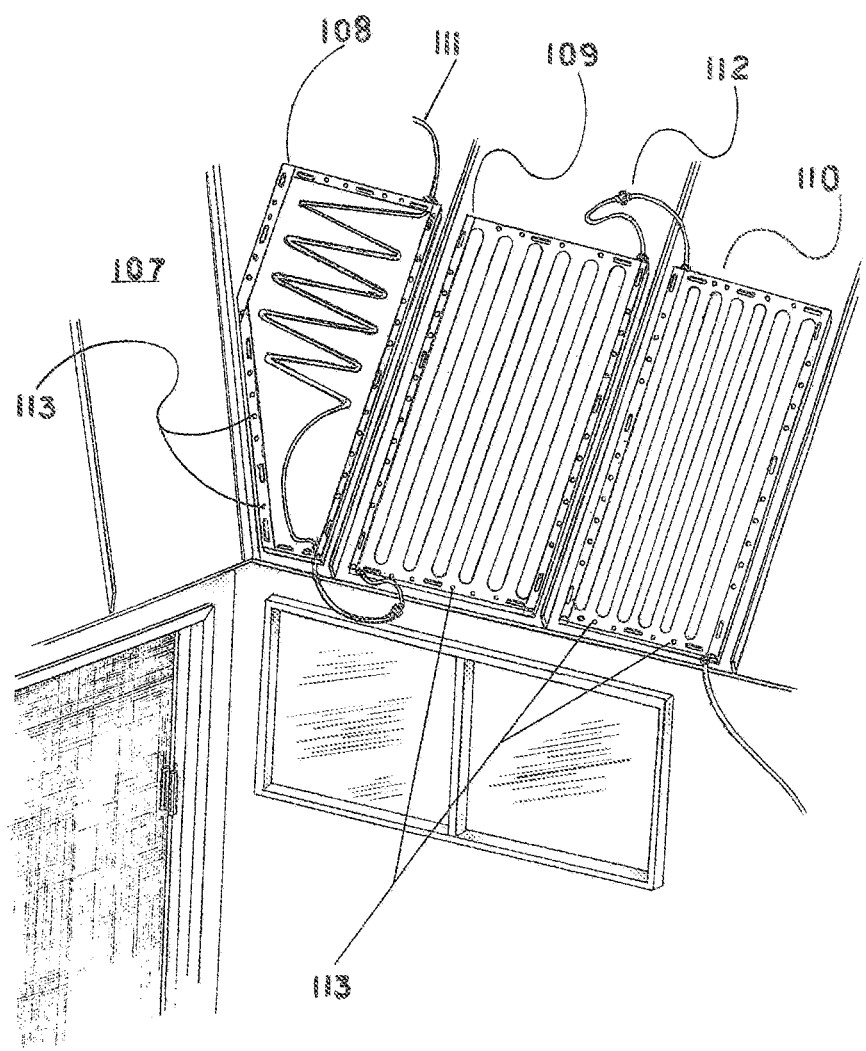
FIG. 1B depicts multiple Universal Lightweight and Portable Deicing Mats with different dimensions and shapes that are attached to metal roofing.

FIG. 1B illustrates roof of building structure with metal roofing, 107, protected with multiple Universal Lightweight and Portable Deicing Mats, 108, 109, and 110 that are interconnected, which come in different dimensions and shapes dictated by the angled of surface areas of that structure, as shown in 108. The said Universal Lightweight and Portable Deicing Mats will be held in place naturally by using its plurality of internal magnets that are strategically placed along the edges of the matting material in a contiguous pattern, 113. This said plurality of Internal Magnets will effortlessly attract any metal roofing surface, keeping the said Universal Lightweight and Portable Deicing Mats, 108, 109, 110 from unintentionally falling off. These said Internal Magnets can be used in conjunction with standard Shingle Clips and Spacer Kit in close-up view detail, FIG. 2, 203, which are prearrange and positioned to the said metal roofing by an adhesive compound. Also in this example, as you can see, these Universal Lightweight and Portable Deicing Mat are designed to link to each other by Electrical Connectors, 111 and 112.

Figure 1C:
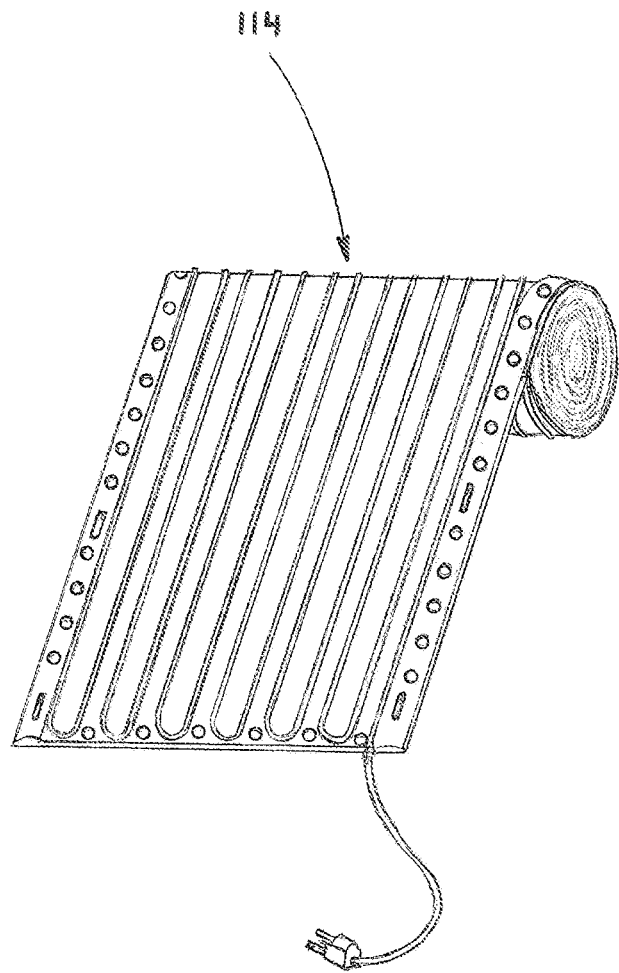
FIG. 1C depicts Universal Lightweight and Portable Deicing Mat that is rolled up for easy storage.

FIG. 1C illustrates a single Universal Lightweight and Portable Deicing Mat that is rolled up for easy storage, 114. After use or during the off-season, the Roof Deicing Mats can be rolled up and stored away just as quickly or can be left on unaffected by natural environments.

Figure 2A:
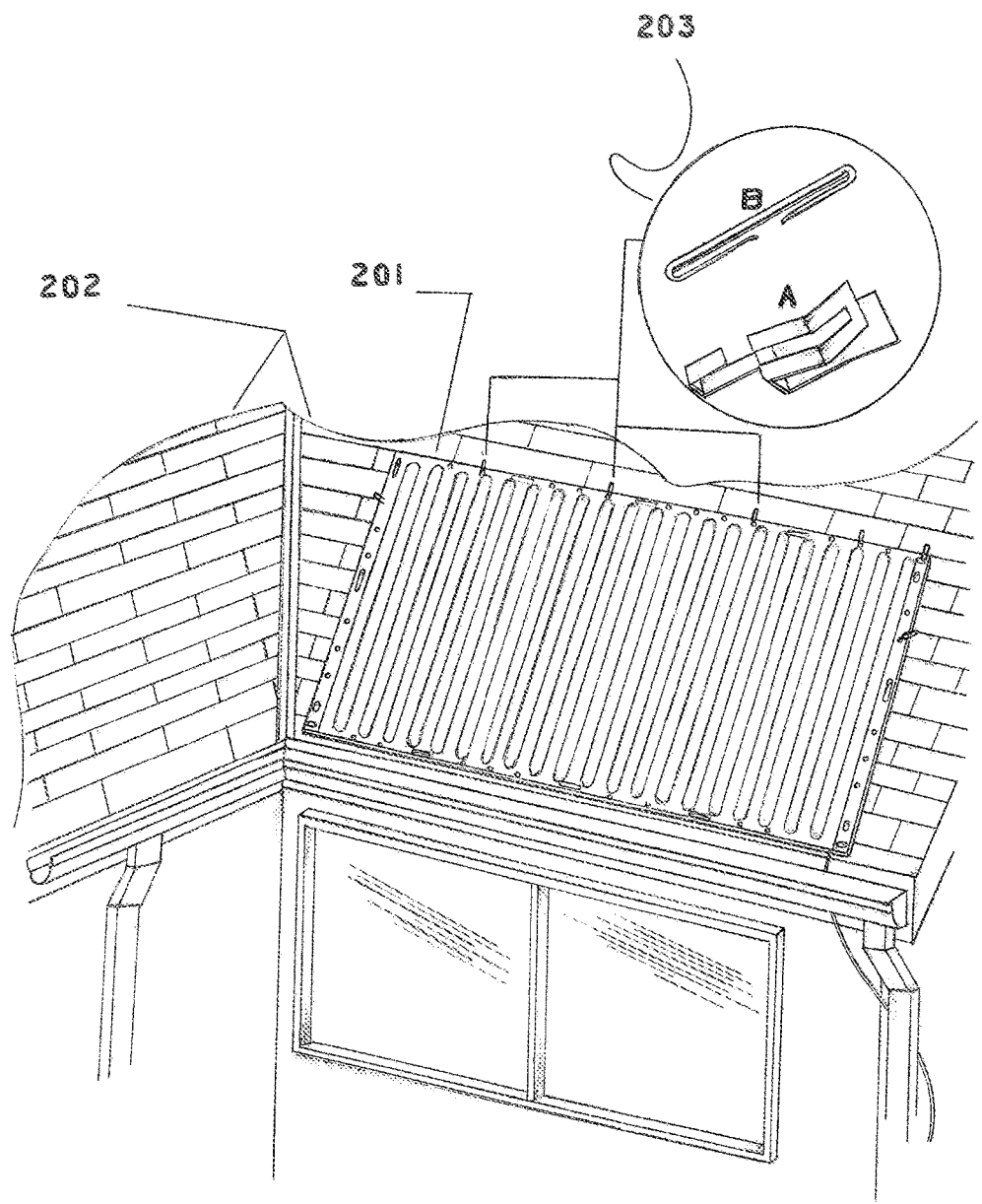
FIG. 2A depicts a single Universal Lightweight and Portable Deicing Mat attached to a roof by Standard Roofing shingle clips.

FIG. 2A illustrates a Single Universal Lightweight and Portable Deicing Mat that is prefabricated in a Geometric Pattern, 201, which is placed flat on top of roofing surface of a structure, 202. This figure also illustrates a close-up view detail of Standard Roofing shingle clips and spacer kit, 203, that are used to secure the said Universal Lightweight and Portable Deicing Mat, 201 to the said roofing surface of a structure, 202.

The said Standard Roofing shingle clips and spacer kit, 203 includes Roofing Shingle Clips, 203-A and an optional Spacer, 203-B. These said devices can commonly be purchased from any hardware store that sells De-Icing cable equipment. These are generally standard De-Icing Cable Kits that are used in conjunction with standard Roofing De-Icing cables to keep gutters and downspouts flowing and help prevent ice from forming under the edge of shingles. The Standard Roofing De-Icing Clip as shown in close-up view 203-A is used to secure the said Universal Lightweight and Portable Deicing Mat, 201 onto the shingles of the roofing surface of a structure, 202.

The Optional Spacers, 203-B are used as extensions to the Standard Roofing De-Icing Clips, 203-A in which when the said Universal Lightweight and Portable Deicing Mat, 201 drapes over split level roofing that overhangs from upper level roof to a lower level roof.

Figure 2B:
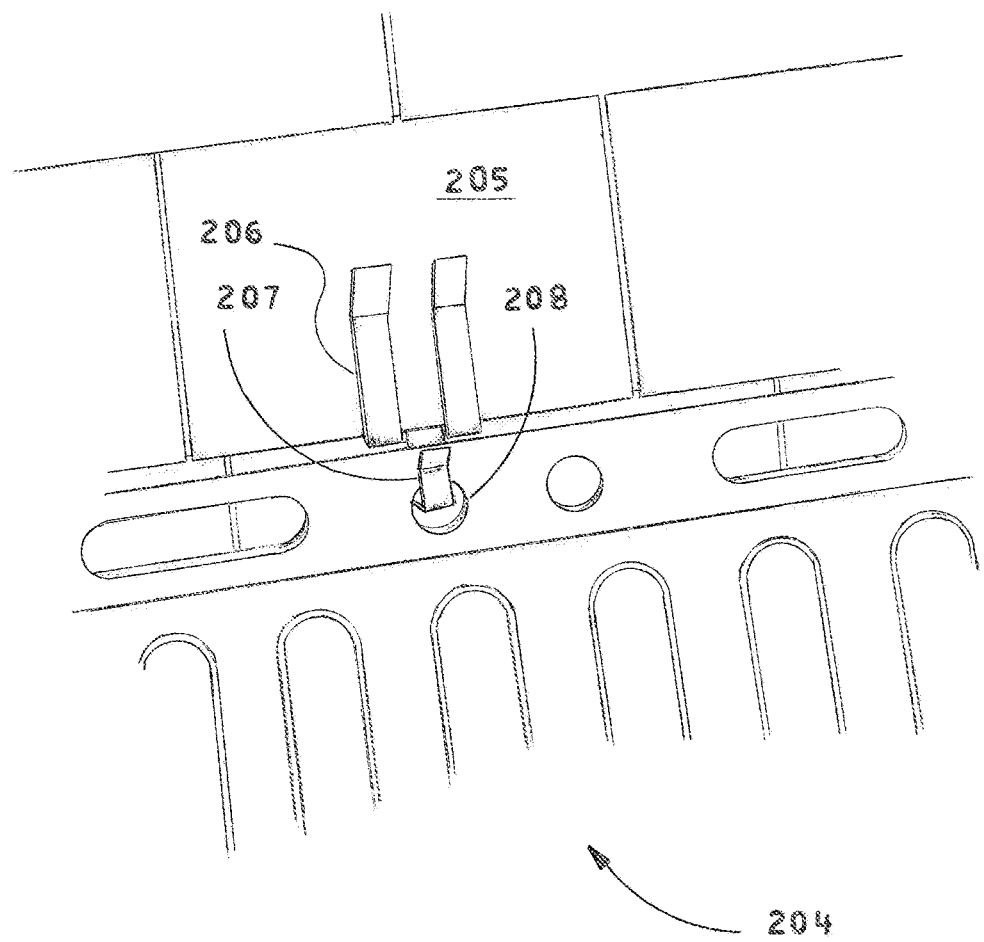
FIG. 2B depicts a closer view of a single Universal Lightweight and Portable Deicing Mat attached to roofing shingles with Standard Roofing shingle clip.

FIG. 2B illustrates a closer view of a single Universal Lightweight and Portable Deicing Mat, 204 positioned on to roofing shingles, 205 and secured with Standard Roofing shingle clips such as, 206.

A closer examination illustrates that Standard Roofing Shingle Clips, 206 gets inserted and pressed into against one of the shingles, 205, thus leaving the clasp of the said Clip, 207 exposed so that the said clasp hooks on to one of the smaller round openings, 208 of the Universal Lightweight and Portable Deicing Mat, 204. By attaching the said matting material in this manner, the Universal Lightweight and Portable Deicing Mat, 204 is left draped over the said roofing material easily.

Figure 3:
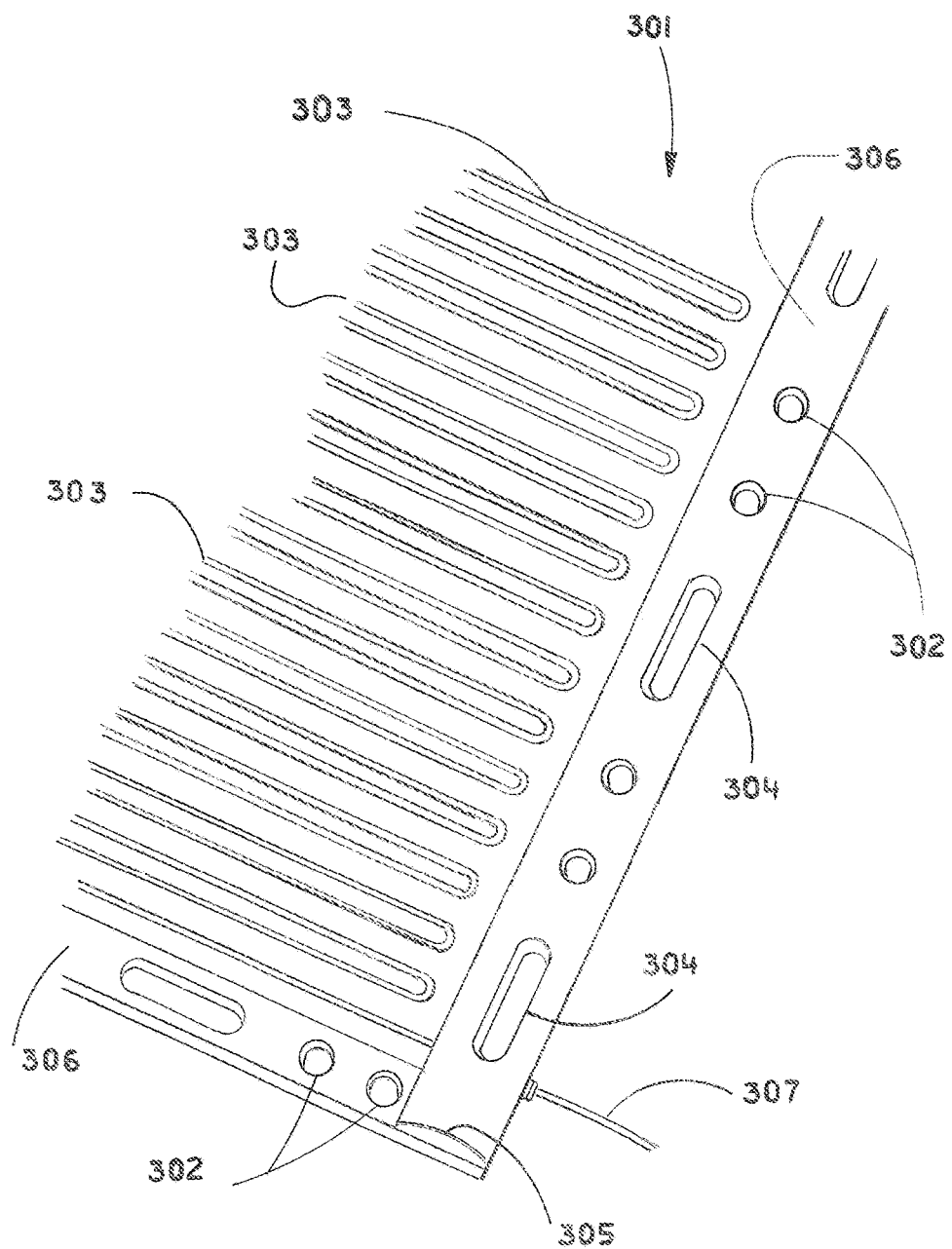
FIG. 3 depicts a Close-Up view of a Universal Lightweight and Portable Deicing Mat with the optional Serpentine Pattern.

FIG. 3 illustrates a close-up view of an electrically operated Universal Lightweight and Portable Deicing Mat, 301. This particular invention begins with the drawings incorporating standard self-regulating Roof deicing cables, 303. In one embodiment, said geometric patterns will be horizontal or across the width of the mat, in another they may be vertical (along the height of the mat). In yet another embodiment, they may be laid at any angle from 0 to 180 degrees when viewing the mat along it width or height. Note that these cables may be laid singularly, or in multiples (side by side), for applications requiring more heat. In 303, these standard self-regulating commercial grade de-icing cables will be strategically laid out in a prearranged geometric pattern, such as a Serpentine Pattern for longer, and tighter cable runs or Zig Zag Pattern for shorter runs.

The said cables, 303 are positioned between the two thin layered, yet flexible, strong, and protective Synthetic Elastomer Rubber like matting materials, such as energy efficient, Ethylene Propylene Diene Monomer (EPDM) like materials or Thermoplastic polyolefin (TPO) like sheeting materials. Large elongated openings, 304 are placed strategically along the edges of the matting material, in a contiguous pattern. These designated large elongated openings, 304 are positioned along the edges of the matting material, 306 in order to establish an initial placement of the matting material onto a structure and to assist in making the necessary adjustments before placing afterward with the assistance of standard Shingle Clips for residential buildings, or Custom Mounting Kit for Logistical Container, which will be discussed in further detail in FIG. 7 through 10.

Pluralities of smaller round openings, 302, are placed strategically along the edges of the matting material in a contiguous pattern. These smaller openings are positioned between the pluralities of larger elongated openings 304 and are used to establish the final placement of the matting material onto a structure using a Custom mounting kit, discussed in further detail in FIG. 7 through 10, or standard Shingle Clips, 203 if the material is to be used on building structures, as shown in FIG. 2. One face of the matting material consisting of a thicker convex surface area, 305 which run along both sides of the Deicing Mat 301. In one embodiment, this thicker surface is convex; in an alternate embodiment it is rectangular (including square).

The thicker convex surface area 305 is utilized by standard Shingle Clips and Spacers, as shown in 203A and 203B or by custom mounting kit described in further detail in FIG. 7 through 10, that will compress against this convex surface as the fasteners or any other mounting brackets are tightened onto the mounting kit, causing the mat to be secured against the structure. 307 is connection to a power source.

Figure 4:
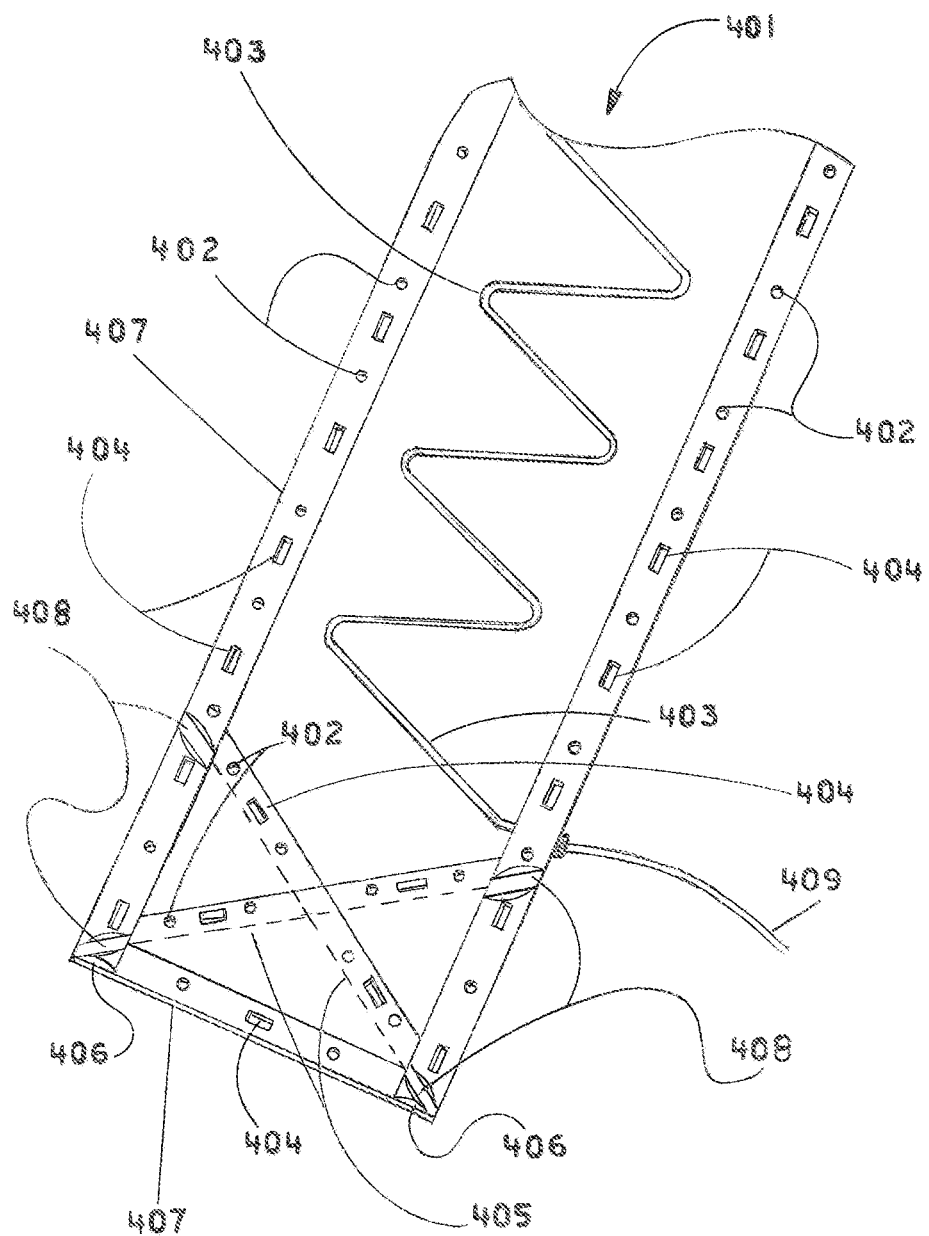
FIG. 4 depicts a Universal Lightweight and Portable Deicing Mat with an Optional standard Zig Zag Pattern.

FIG. 4, illustrates a close-up view of a Universal Lightweight and Portable Deicing Mat, 401, incorporated with self-regulating commercial grade de-icing cables, that are strategically laid out in a prearranged geometric pattern such as a Zig Zag Pattern for shorter cable runs 403. They may be laid at any angle from 0 to 180 degrees when viewing the mat along it width or height. These cables may also be laid singularly, or in multiples (side by side), for applications requiring more heat.

These cables, 403 are also positioned between the two thin layered, yet flexible, strong, and protective Synthetic Elastomer Rubber like matting materials, such as polytetrafluoroethylene (PTFE), energy efficient, Ethylene Propylene Diene Monomer (EPDM) like materials or Thermoplastic polyolefin (TPO) like sheeting materials. Large elongated openings, 404, are placed strategically along the edges of the matting material in a contiguous pattern, 407. These designated large elongated openings are also positioned along the matting material to establish an initial placement of the matting material onto a structure and to assist in making the necessary adjustments before placing afterward with the assistance of standard Shingle Clips as shown in, 203 for residential buildings, or Commercial vehicles, which will be examined in further detail in FIG. 7 through FIG. 10.

A series of smaller round openings, 402, are placed strategically along the edges of the matting material in a contiguous pattern. These smaller openings are positioned between the larger elongated openings, 404 and are used to establish the final placement of the matting material onto a structure before using standard Shingle Clips, 203.

Distinctive features of all these Universal Lightweight and Portable Deicing Mat as in 401 will consist of strategically placed visible markers, 405 to help aid consumers to cut these corners of these mats safely in a Triangular fashion in various degrees in order to have them be ultimately arranged near angled surfaces of the roofing shingles of buildings and other structures as such. The Universal Lightweight and Portable Deicing Mat in 401 also consist of narrow angular channels, 408, which are cut approximately half the thickness of the said matting material, placed within the corner edges of matting material's Thicker Convex Surface Area, 406 and leading a quarter way along the said matting material's Thicker Convex Surface Area, indicating the starting location of the incisions to be made by which the consumer will continue that cut along the strategically placed Visible Markers, 405. Element 409 is a power cable connection to a power source. The outcome after cutting these corners of the said matting materials and laying them out in a pre-arranged pattern is shown in previous diagrams in FIG. 1A, 102, 103, and FIG. 1B, 108.

For aesthetic purposes, these said Universal Lightweight and Portable Deicing Mat, 401, will also comprise of different colors to match any color of roofing material, and can also be custom prefabricated to customer specifications.

Figure 5:
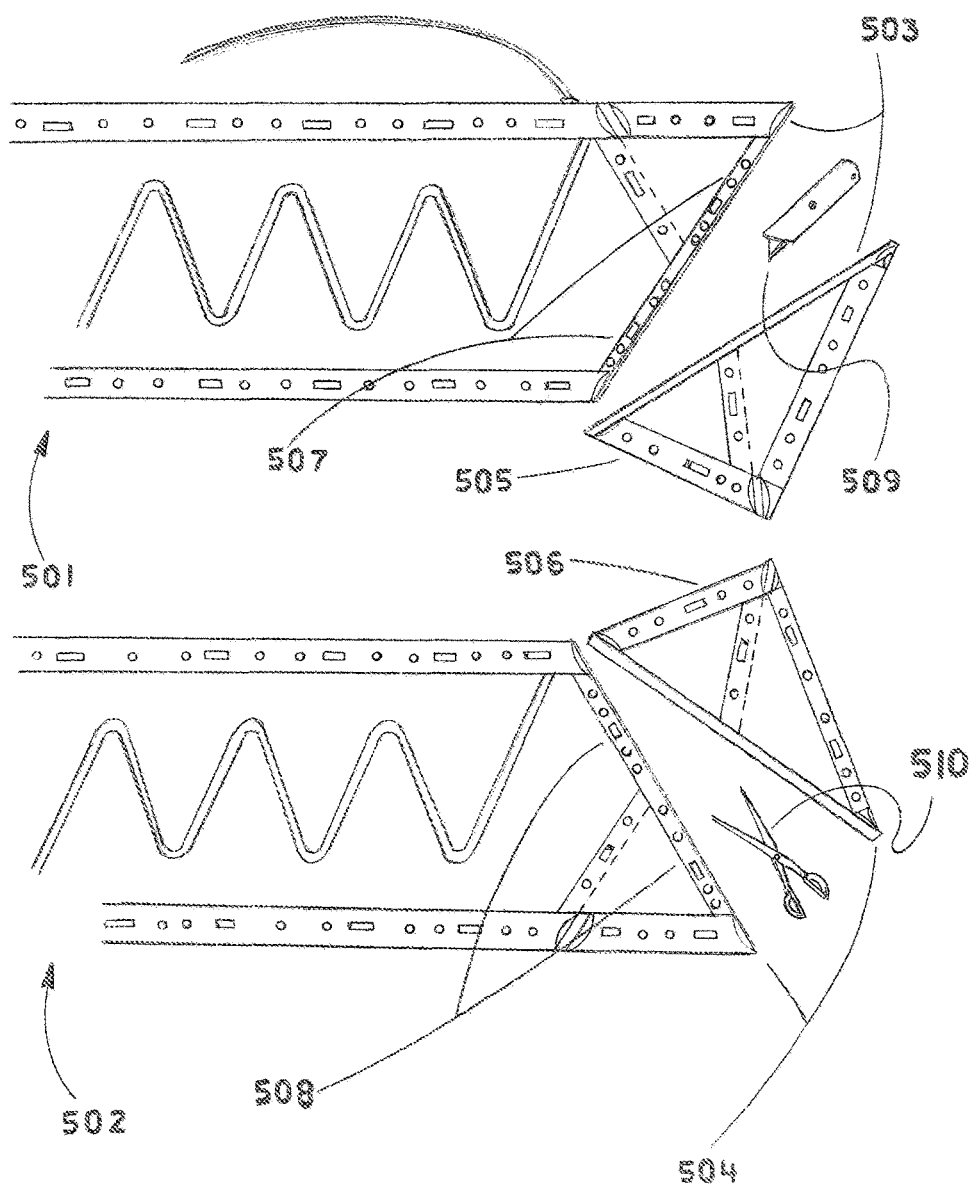
FIG. 5 depicts Universal Lightweight and Portable Deicing Mats, being adapted to fit roof corners.

FIGS. 5, 501 and 502 are perspective close up views of Universal Lightweight and Portable Deicing Mat, which gives the option for consumers to strategically cut and separate portions of the matting material safely from two different angles, in order to have them be positioned near angled areas of the roofing surfaces of buildings and other structures as such; as illustrated in 102, 102, and 108. Either corners of the matting materials, 503 and 504 can be cut and separated to form the main portion of the said Deicing Mats into triangular shapes with various degrees so that said Universal Lightweight and Portable Deicing Mats, 501 and 502 can fit along side the Hips of the roofing shingles for L-Shaped roofing or both corners can be cut to form an Arrow shape, to wedge between two corners roofing of equal size such as a Roof Valleys.

By referring to the Diagram previously describing 405 and 408, a further examination of 501 and 502 demonstrate one example of a Universal Lightweight and Portable Deicing Mat with option of having the corners of the said Matting Materials be cut either with a utility knife, 509 or shears, 510, to form two different angles, thus separating portions of Matting Material, 503 and 504, and discarding the unused Triangular portions of the Matting Material all together, 505 and 506. By discarding the said unused portions of the Matting Material 505 and 506, the serviceable portions of the Lightweight Deicing Matting Material can then be used and be secured by the newly altered cornered edges the said matting material, 507 and 508.

Though these perspective close-up views of the said Deicing Mats, 501 and 502 are presented with descriptions to the said de-icing cables with a Zigzag pattern, these descriptions also refer to all other subsequent drawings with de-icing cables, which are laid out in a Serpentine, and any other patterns.

Figure 6:
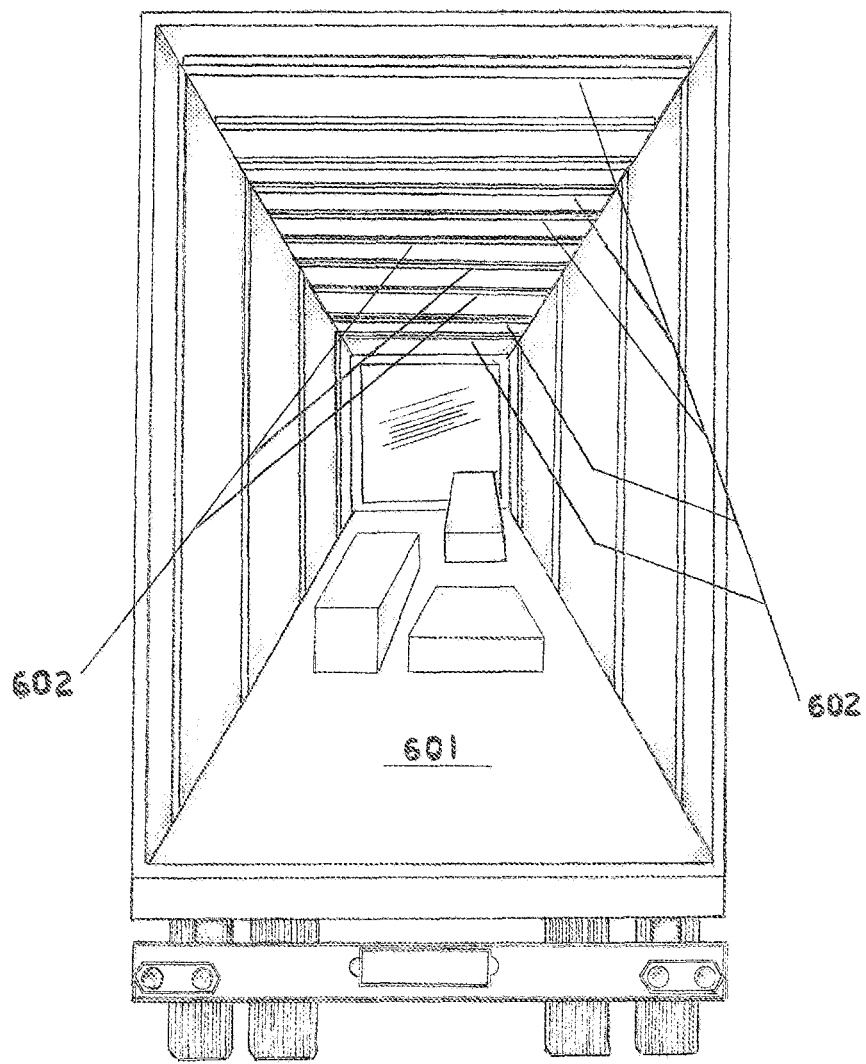
FIG. 6 depicts interior view of a Logistical Container.
Figure 7:
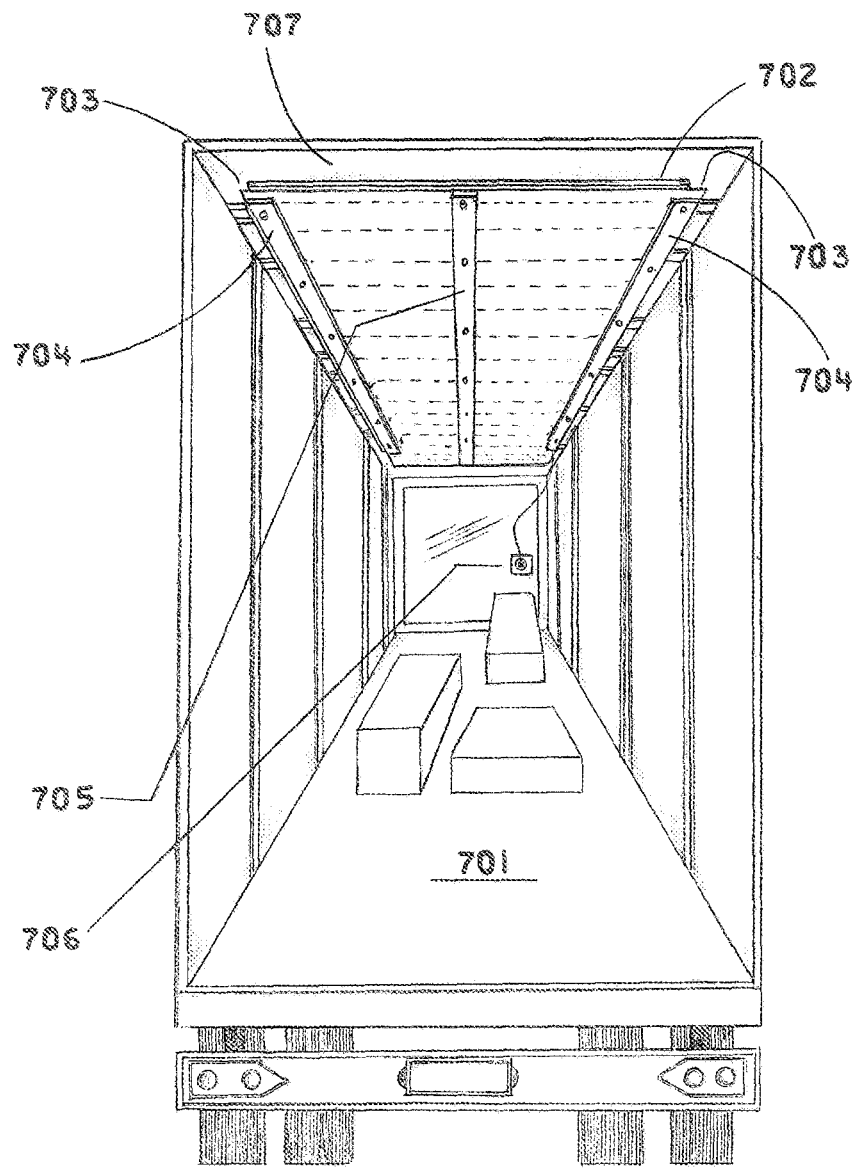
FIG. 7 depicts Universal Lightweight and Portable Deicing Mat placed in the interior of a Logistical Container.

FIG. 6 illustrates is a perspective view of an interior of a Logistical Container Truck, 601 prior to installing the Universal Lightweight and Portable Deicing Mat onto the interior ceiling of the Logistical Container Truck, as described in FIG. 7. As shown, these internal studs, 602 are positioned horizontally across the ceiling of the interior Logistical Container Truck. These help in providing monocoque fuselage strength, to help stabilize the roofing surface from collapsing. These stated internal studs will be used for Deicing Mat and associated Custom ZL Mounting Bracket assembly as disclosed in FIG. 7, to be positioned and secured against the interior ceiling of the Logistical Container.

Figure 8:
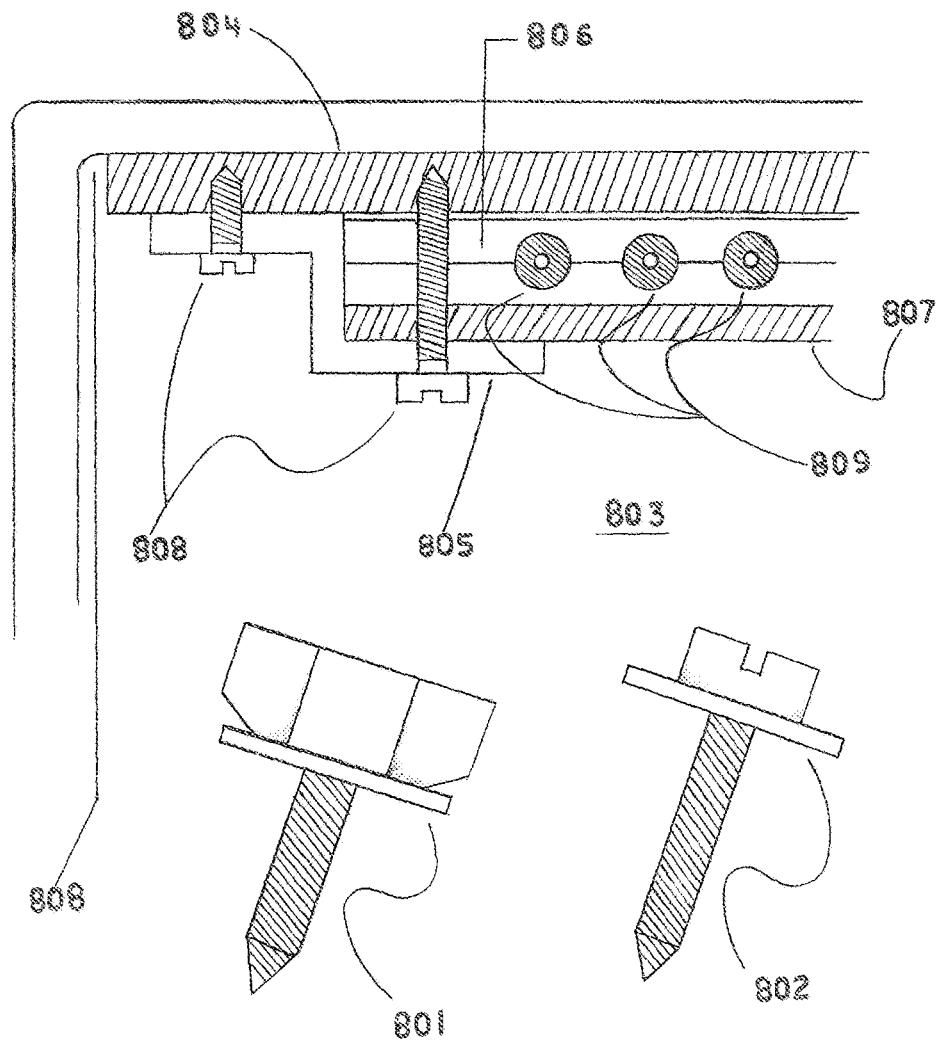
FIG. 8 depicts a cross sectional view of a Universal Lightweight and Portable Deicing Mat placed against the interior ceiling of a Logistical Container.

FIG. 7 illustrates a perspective view of an interior of a Logistical Container 701, containing a Universal Lightweight and Portable Deicing Mat 702 fastened to the interior ceiling of the Logistical Container that is held in place by a custom, prefabricated designed Custom Mounting Kit, which contains a Sheet Metal Housing Unit, 703, Custom ZL Mounting Brackets, 704, a Flat Mounting Bracket, 705, and associated bolt/screw fasteners, discussed in FIGS. 8, 801 and 802. This said Mounting Kit is affixed to the Logistical Container's internal studs as shown previously in 602 as anchoring points, which are positioned horizontally across the interior ceiling of the Logistical Container, and extends the entire length of the Logistical Container.

Center Mounted Flat Bracket unit, 705 will be pressed up against the custom prefabricated Sheet Metal Housing Unit, 703, keeping the entire length of the Universal Lightweight and Portable Deicing Mat 702 flush against the ceiling of a Logistical Container, 707, which will assist in providing and maintaining a more efficient thawing process of the snow and ice buildup on the entire outside roofing surface of the Logistical Container Truck, 701.

706 is an example of an Standard or Custom Electrical Receptacle box being used to power the Universal Lightweight and Portable Deicing Mat, 702.

These components in its entirely will then be secured with bolt/screw fasteners, FIG. 8, 801 and 802, or by other similar anchoring methods up against the interior ceiling surface of said Logistical Container, 707 during transit or when stationary.

FIG. 8 illustrates a perspective cross sectional view of an interior of a Logistical Container 803 with an Electrically operated Universal Lightweight and Portable Deicing Mat, 806, positioned at the surface of the ceiling, 810. Comprising a cross section of self-regulating commercial grade de-icing cabling 809, positioned horizontally on interior ceiling of a Logistical Container, 810 and secured with said custom prefabricated designed Custom ZL Mounting Brackets, 805 with the necessary bolt/screw fasteners or by other similar anchoring devices, 808, which are secured to the Internal Studs of the Logistical Container, 804. In one embodiment, the custom, prefabricated designed Sheet Metal Housing Unit, positioned horizontally in 807, compressing against the Universal Lightweight and Portable Deicing Mat, 806. This custom, prefabricated designed Sheet Metal Housing Unit; 807 is designed to provide the structural integrity stability, as well as even heat dispersion of the Universal Lightweight and Portable Deicing Mat, 806 against the roof structure of the Logistical Container, 803.

This Custom, Prefabricated Designed Sheet Metal Housing Unit 807 will also have the same-dimensioned elongated openings as well as along with the series of smaller round openings as the matting material in FIGS. 3, 302 and 304; positioned strategically in a contiguous pattern along the edges of the Custom Prefabricated Designed Sheet Metal Housing Unit 807.

801 and 802 illustrate a perspective view of bolt/screw fasteners with washers being used as examples to help secure Custom ZL Mounting Brackets 805, or any other similar brackets types used, which are attach to the Sheet Metal Housing Unit 807, which compresses against the Universal Lightweight and Portable Deicing Mat 806; keeping the entire length of the said Universal Lightweight and Portable Deicing Mat 806 flush against the interior ceiling of a Logistical Container, 810, thus assisting in providing and maintaining a more efficient thawing process of the snow and ice buildup on the entire outside roofing surface of the Logistical Container Truck, 803.

These said bolt/screw fasteners 801 and 802 are commercial grade, stainless alloy material, designed to withstand the harsh winter elements. In one embodiment, Thumb Screw 801 type of bolt, which can be used to make it easier to fasten and unfasten said mounting s, without needing an external driver or an electrical drill, in order to store the Universal Lightweight and Portable Deicing Mat during off season, should one decide to. In an alternate embodiment, a standard bolt type with washer 802, can be used for permanent placement of Custom ZL Mounting Brackets, or any brackets similar to, which doesn't require the repeated fastening and unfastening said Custom ZL Mounting Brackets, 805.

Figure 9:
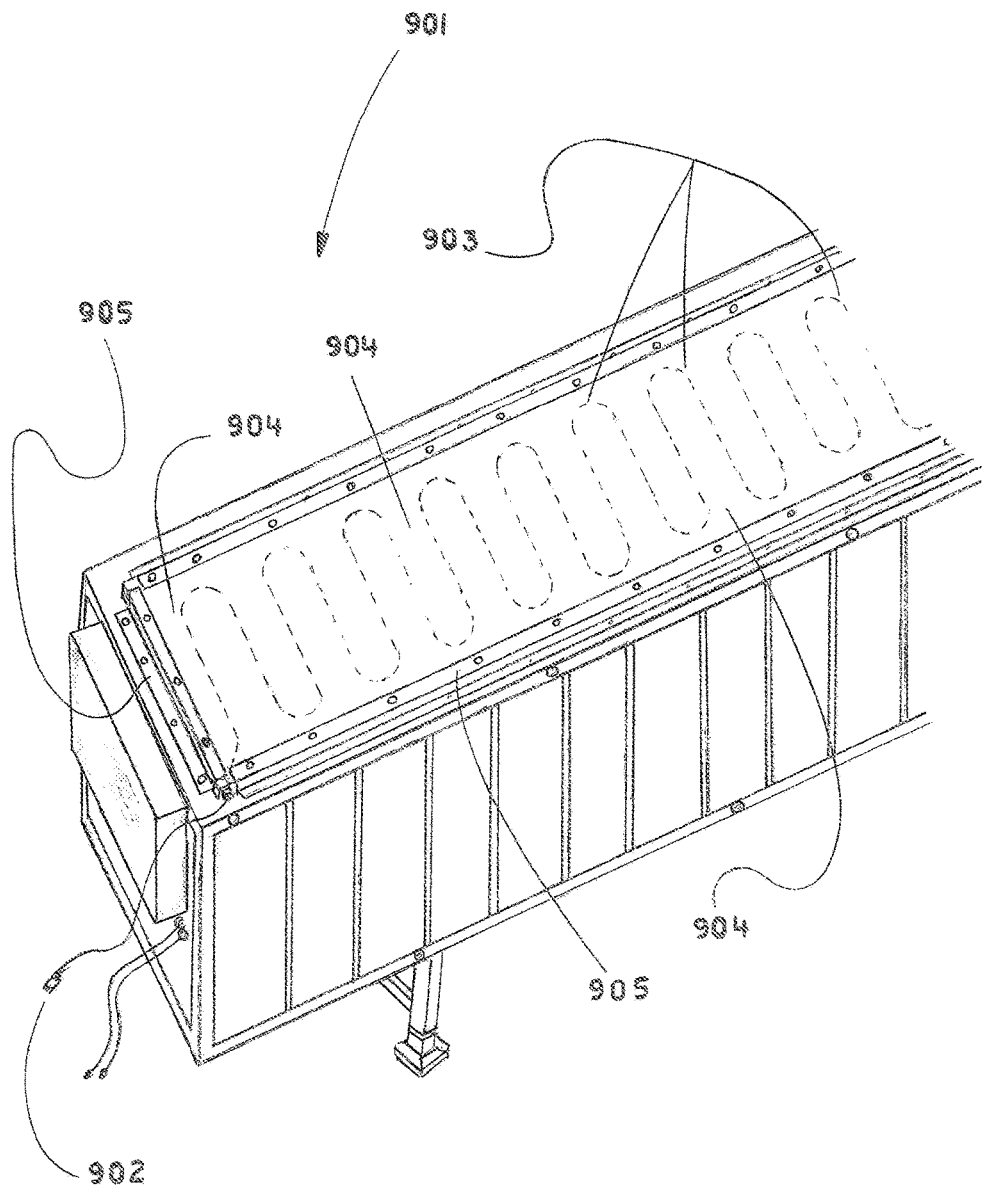
FIG. 9 depicts Universal Lightweight and Portable Deicing Mat, placed on top of a Logistical Container.

FIG. 9 illustrates a perspective view of a Logistical Container 901 as an example in which one or more Universal Lightweight and Portable Deicing Mats, 903 positioned externally, flat on top of the Logistical Container 901. In this example, the said externally placed Universal Lightweight and Portable Deicing Mat being placed externally on said Logistical Container Truck.

Positioned Horizontally and top of this Universal Lightweight and Portable Deicing Mat in 903 is a Custom prefabricated Designed Sheet Metal Housing Unit, 904. In which will aid and assist the radiation of heat from the said mat producing a quicker thawing process of snow and ice buildup in a more efficient manner. During transit and when stationary, this Custom prefabricated Designed Sheet Metal Housing Unit, 904 is also designed to assist in providing the structural integrity, stability, as well as Even Heat Distribution of the said Universal Lightweight and Portable Deicing Mat, 903. The Custom ZL Mounting Brackets 905 is employed lastly to secure all components related to the Universal Lightweight and Portable Deicing Mat, FIG. 9, 903 on top the Logistical Container 901; which include the following: (Universal Lightweight and Portable Deicing Mat Deicing Mat, 903, Custom prefabricated Designed Sheet Metal Housing Unit, 904, and Custom ZL Mounting Brackets, 905). These combined elements will then be secured with bolt/screw fasteners or by other similar anchoring devices as presented in FIGS. 801 and 802, to hold said Deicing Mat flat and stable against the top surface of said Logistical Container, 901 during transit or when stationary.

Note that the very same Universal Lightweight and Portable Deicing Mat Deicing Mat, 903 can also be rolled out and positioned externally flat on top of the Logistical Container 901 without using a Custom, prefabricated Designed Sheet Metal Housing Unit, 904. The Universal Lightweight and Portable Deicing Mat Deicing Mat can also be independently employed with a chemical compound prepared specifically for Universal Lightweight and Portable Deicing Mat Deicing Mat, 903 to the external roofing surface of Logistical Container, 901 for a more semi-permanent adhesion; which can be easily removed with a heat gun when they need to be replaced. This Chemical Compound will be universally compatible with any Synthetic Elastomer Rubber like sheeting materials, such as energy efficient, Ethylene Propylene Diene Monomer (EPDM) like materials or Thermoplastic polyolefin (TPO) like materials that is employed.

Note that in an present embodiment, an alternate solution, the Universal Lightweight and Portable Deicing Mat Deicing Mat 903 with the Custom prefabricated Designed Sheet Metal Housing Unit, 904, and along with Custom Mounting Kit 905 may also be attached to the roof of a uni-body, such as, a delivery truck where there is no trailer per se, but instead one where the cabin and the truck compartment are mounted on the same chassis.

During the ice and snow thawing process, the attached power cord, 902 is plugged hooked onto the power source of a Tractor Truck, along with the other supplementary power cords. In one embodiment, said power source is an AC source, whereas in an alternate embodiment, it is a DC source.

Figure 10:
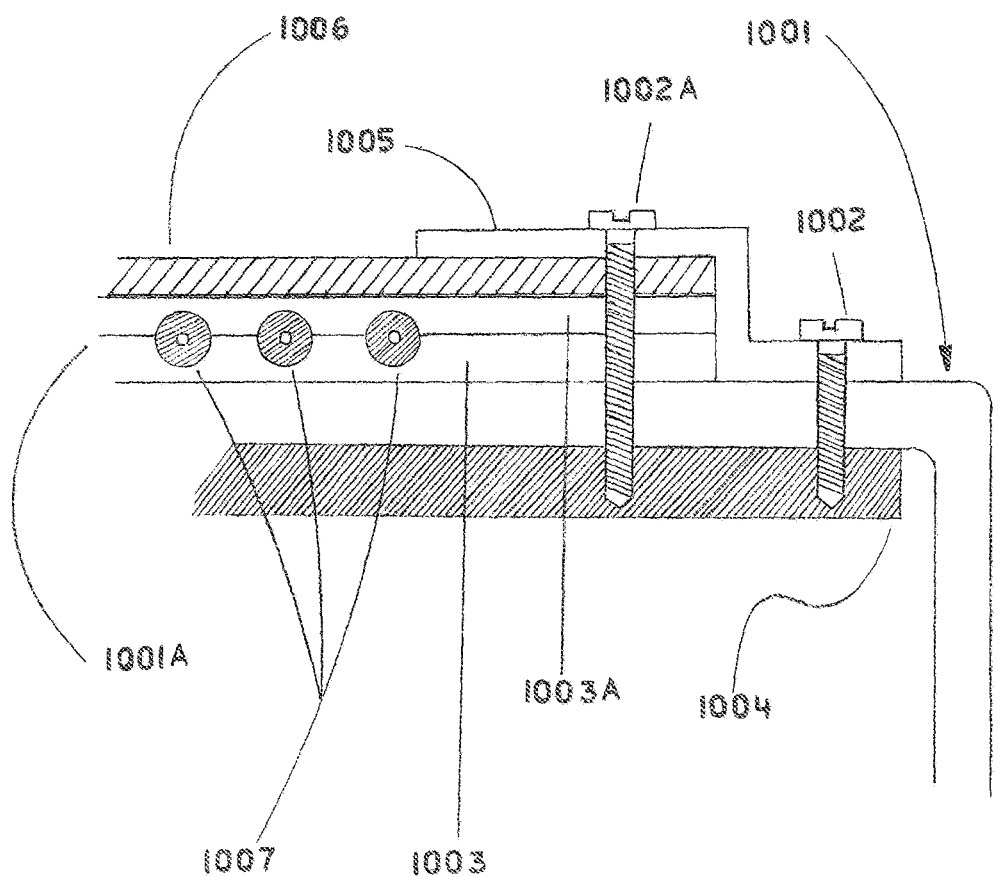
FIG. 10 depicts a cross sectional view of a Universal Lightweight and Portable Deicing Mat placed externally on top of a Logistical Container.

FIG. 10 illustrates a perspective close-up, cross sectional view of a exterior surface of a Logistical Container, 1001, with an Electrically operated Universal Lightweight and Portable Deicing Mat, 1001A, positioned horizontally on the exterior surface of a Logistical Container, 1001 and secured with custom designed mounting bracket 1005, with the necessary bolt/screw fasteners, or by other similar types of anchoring systems. 1002 and 1002A. These said bold/screw fasteners are secured to the Internal Studs of the Logistical Container 1004. The Universal Lightweight and Portable Deicing Mat, 1001A is initially arranged horizontally on the exterior surface of a Logistical Container, 1001, comprising a cross sectional view of a Electrically operated, self-regulating commercial grade de-icing cables 1007. These standard self-regulating commercial grade de-icing cables are strategically laid out in a prearranged pattern as stated previously in FIG. 3, 303 and FIG. 4, 403 that are enclosed and sealed of said deicing cables, 1007 between two thin, lightweight, yet strong and protective Synthetic Elastomer Rubber like sheeting materials, such as energy efficient, Ethylene Propylene Diene Monomer (EPDM) like materials or Thermoplastic polyolefin or (TPO) or, polytetrafluoroethylene (PTFE), like materials formed as one piece, 1003 and 1003A.

In one embodiment, the Custom ZL Mounting Brackets, 1005 is a customized mounting bracket, allowing for the upper portion of the said bracket be fastened securely by one or more bolt fasteners, 1002A to the said area of the convex surface region as displayed previously in 305 of the Universal Lightweight and Portable Deicing Mat FIG. 3. The lower portion of bracket is secured to the trailer exterior, 1001 via one or more bolt/screw fasteners, 1002. As these designated bolt/screw fasteners 1002 and 1002A are being fastened, the Custom ZL Mounting Brackets, 1005 compresses the top surface region the Custom, Prefabricated Designed Sheet Metal Housing Unit, 1006 positioned horizontally, thereby compressing against the Universal Lightweight and Portable Deicing Mat, 1001A.

This said Layer of Sheet Metal, 1006 is designed to provide the structural integrity stability, as well as even heat dispersion of the Universal Lightweight and Portable Deicing Mat, 1001A against the roof structure of the Logistical Container, 1001. In all, this process will keep the Universal Lightweight and Portable Deicing Mat, 1001A completely stable and flat against the ceiling of said Logistical Container 1001 during transit or when said trailer is stationary, thus assisting in maintaining an even thawing process of the snow and ice buildup on the entire outside of the roofing surface of the Logistical Container 1001.

Figure 11:
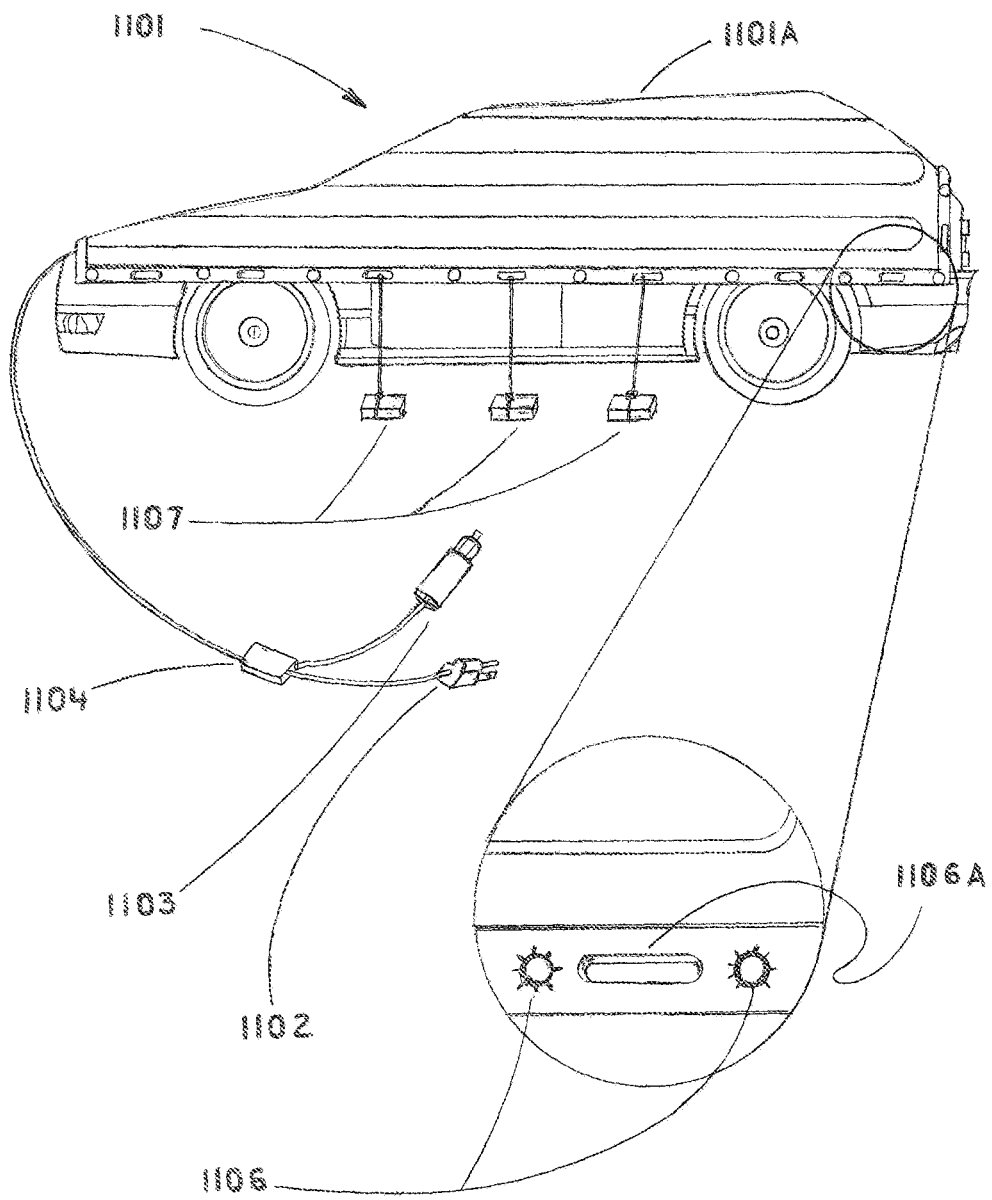
FIG. 11 depicts a side view of a vehicle with Universal Lightweight and Portable Deicing Mat draped on top.

Universal Lightweight and Portable Deicing Mat, can additionally be used on various types of vehicles to melt ice and snow as shown in FIG. 11. FIG. 11 represents a perspective side profile of a vehicle, 1101A, with a Universal Lightweight and Portable Deicing Mat, 1101, draped over the said vehicle.

This type of said Universal Lightweight and Portable Deicing Mat, 1101 melts ice and snow, by having the said mat be draped over the entire vehicle, as shown on 1101A, and have the Universal Lightweight and Portable Deicing Mat be held in place naturally by using its plurality of internal magnets that are strategically placed along the edges of the matting material in a contiguous pattern, 1105. This said plurality of Internal Magnets will effortlessly attract any metal body of a vehicle, keeping the said Universal Lightweight and Portable Deicing Mat, 1101 from unintentionally falling off.

Positioned between these pluralities of internal magnets, 1105 are also larger elongated openings, 1105A that are placed strategically along the edges of the said matting material in a contiguous pattern, which are made to attach optional anchoring weights used for stormier conditions, 1107.

The Universal Lightweight and Portable Deicing Mat, 1101 can be powered by a Dual Universal Auto Charger, either by DC power Auto Adapter, 1103 or via AC adapter, 1102, which are both combined into one unit with a built in Universal Power Adapter, 1104. With this configuration, a car owner can plug into an outdoor-grounded AC outlet or auto's own 12v power outlet when an AC outlet is not available to melt accumulation of ice and snow.

As an example, if an owner of an vehicle has an auto restart feature built in, they can open a side window of their auto just slight enough to pull in the auto charger, 1102 of the said Universal Lightweight and Portable Deicing Mat, 110A, plug it into the auto's 12 volt power outlet, drape back the Universal Lightweight and Portable Deicing Mat back to cover the side window. Then when sufficient amount of snow has accumulated over of the vehicle, the owner can engage their auto restart mechanism, which will enable the said Universal Lightweight and Portable Deicing Mat, 1101 to heat the exterior surface of the vehicle, 1101A, therefore melting the snow and ice buildup over the entire vehicle.

After when Universal Lightweight and Portable Deicing Mat has completely melts the Ice and Snow built up over the entire vehicle, the owner can simply roll up the heating mat and store it in the trunk of their vehicle.

Refer to 1106 for a Close-up View of the internally placed Magnets and 1106A for a Close-up View of the larger elongated Opening.

CONCLUSION

In concluding the detailed description, it should be noted that it would be obvious to those skilled in the art that many variations and modifications can be made to the preferred embodiment without substantially departing from the principles of the present invention. Also, such variations and modifications are intended to be included herein within the scope of the present invention as set forth in the appended claims. Further, in the claims hereafter, the structures, materials, acts and equivalents of all means or step-plus function elements are intended to include any structure, materials or acts for performing their cited functions.

It should be emphasized that the above-described embodiments of the present invention, particularly any "preferred embodiments" are merely possible examples of the implementations, merely set forth for a clear understanding of the principles of the invention. Any variations and modifications may be made to the above-described embodiments of the invention without departing substantially from the spirit of the principles of the invention. All such modifications and variations are intended to be included herein within the scope of the disclosure and present invention and protected by the following claims.

The present invention has been described in sufficient detail with a certain degree of particularity. The utilities thereof are appreciated by those skilled in the art. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the forgoing description of embodiments.

The embodiments of the invention in which an exclusive property or privilege is claimed are defined as follows:

1. A device configured to remove snow and/or ice from a surface, the device comprising:
    a deicing mat having,
        at least one heat-conveying polymer sheet having at least one element wire sealed within the at least one heat-conveying polymer sheet, the at least one element wire being distributed within the heat-conveying polymer sheet and configured for electrical connection with a power supply or with another at least one element wire sealed within another heat-conveying polymer sheet of at least one or more different deicing mats; and
    a fastener edge configured within the at least one heat-conveying polymer sheet, the fastener edge comprising embedded magnets and a plurality of orifices configured to receive mounting hardware to provide temporary or permanent attachment to the surface;
    wherein the fastener edge occupies the perimeter boundaries of the heat-conveying polymer sheet and comprises the embedded magnets intermingled with the plurality of orifices, the plurality of orifices comprising a plurality of extended slots and a plurality of circular openings, the slots and circular openings being evenly spaced and distributed with the embedded magnets;
    wherein the at least one element wire is asymmetrically distributed within the heat-conveying polymer sheet leaving a region without the at least one element wire;
    wherein the heat-conveying polymer sheet includes a severing region that occupies the region without the presence of the at least one element wire, the severing region having incision markings serving as a guide to excise or cleave off the severing region from the remainder of the heat-conveying polymer sheet having the at least one element wire uniformly or symmetrically distributed within it; and
    wherein the severing region includes a fastener pathway running internal to and parallel with the incision markings spanning across the severing region and contacting the fastener edge, the fastener pathway having at least one of embedded magnets, elongated slots, and circular openings.

2. The device of claim 1, wherein the at least one heat-conveying polymer sheet comprises a synthetic elastomer rubber derived from at least one of Ethylene Propylene Diene Monomer, Thermoplastic Polyolefin, or Polytetrafluoroethylene.

3. The device of claim 2, wherein the deicing mat further comprises color pigments in the synthetic elastomer rubber.

4. The device of claim 1, wherein the at least one element wire has a contiguous zig-zag pattern, a serpentine pattern, a coil pattern, a sinusoidal pattern, or a honeycomb pattern.

5. The device of claim 1, wherein the shape of the remainder of the heat-conveying polymer sheet having the at least one element wire uniformly or symmetrically distributed within it is triangular, quadrilateral, rectangular, square, trapezoidal, pentagonal, isosceles trapezoidal, or right-angled half trapezoidal.

6. The device of claim 1 wherein the severing region is substantially triangular.

7. The device of claim 1, wherein the deicing mat is mounted to roofs of domiciles, commercial buildings, or mobile vehicles.

8. The device of claim 1, wherein the at least one deicing mat is flexible and can be rolled.

9. The device of claim 1, wherein the at least one element wire sealed within the at least one heat-conveying polymer sheet comprises the at least one element wire sealed between two heat-conveying polymer sheets by a process including at least one of heat sealing, mechanical sealing, or chemical sealing.

10. The device of claim 1, wherein the at least one element wire is compatible with electrical power delivered by a direct current source, by an alternate current source, or by a dual powered power supply providing both alternating and direct currents.

11. The device of claim 10, wherein connection with the power supply or with another at least one element wire sealed within another heat-conveying polymer sheet of at least one or more different deicing mats is connected in series or parallel circuits.

\* \* \* \* \*